(12) United States Patent
Lee

(10) Patent No.: US 11,819,374 B2
(45) Date of Patent: Nov. 21, 2023

(54) DRILL FOR DENTAL IMPLANT PROCEDURE

(71) Applicant: MEDIMECCA Co., Ltd., Seoul (KR)

(72) Inventor: Jin Lee, Gwangmyeong-si (KR)

( * ) Notice: Subject to any disclaimer, the term of this patent is extended or adjusted under 35 U.S.C. 154(b) by 0 days.

(21) Appl. No.: 17/161,758

(22) Filed: Jan. 29, 2021

(65) Prior Publication Data

US 2022/0233274 A1 Jul. 28, 2022

(30) Foreign Application Priority Data

Jan. 28, 2021 (KR) ........................ 10-2021-0012259

(51) Int. Cl.
*A61C 3/02* (2006.01)
(52) U.S. Cl.
CPC ..................................... *A61C 3/02* (2013.01)
(58) Field of Classification Search
CPC ........... A61C 3/02; A61C 8/0089; A61C 3/00; A61C 3/025; A61C 8/0092; A61C 1/084; A61C 1/08; A61C 1/10; A61B 17/16
See application file for complete search history.

(56) References Cited

U.S. PATENT DOCUMENTS

| | | | | |
|---|---|---|---|---|
| 5,941,706 A * | 8/1999 | Ura | ........................ | A61C 3/02 433/165 |
| 6,739,872 B1 * | 5/2004 | Turri | ...................... | A61B 17/16 408/202 |
| 8,899,980 B2 * | 12/2014 | Chen | ...................... | A61C 1/087 433/165 |
| 9,693,840 B2 * | 7/2017 | Hufschmied | ...... | A61C 13/0006 |
| 2002/0094508 A1 * | 7/2002 | Lorenzi | ................ | A61C 8/0089 433/165 |
| 2005/0003327 A1 * | 1/2005 | Elian | .................... | A61C 8/0089 433/165 |
| 2008/0090210 A1 * | 4/2008 | Brajnovic | ............ | A61C 8/0089 433/165 |
| 2009/0142731 A1 * | 6/2009 | Kim | ...................... | A61C 8/0092 433/165 |
| 2009/0259227 A1 * | 10/2009 | Ahn | ..................... | A61C 8/0089 606/80 |

(Continued)

FOREIGN PATENT DOCUMENTS

| DE | 102017202407 A1 * | 8/2018 | ............... A61C 3/02 |
|---|---|---|---|
| KR | 10-1019121 | 3/2011 | |

(Continued)

OTHER PUBLICATIONS

English Specification of 10-1019121.

*Primary Examiner* — Heidi M Eide
*Assistant Examiner* — Lina Faraj
(74) *Attorney, Agent, or Firm* — ANTONIO HA & U.S. PATENT, LLC

(57) ABSTRACT

A drill for dental implant procedure is provided. The drill for dental implant procedure may include a body portion extending in a longitudinal direction and including cylindrical first and second rotating portions rotatable in both directions about a central axis, wherein the first rotating portion comprising: a cutting head portion, a first spiral groove portion, and a first cutting side, wherein the second rotating portion formed integrally with the first rotating portion comprising: a second spiral groove portion, and a second cutting side surface portion.

4 Claims, 8 Drawing Sheets

(56) References Cited

U.S. PATENT DOCUMENTS

| | | | | |
|---|---|---|---|---|
| 2009/0305189 | A1* | 12/2009 | Scortecci | A61C 8/0089 |
| | | | | 433/165 |
| 2013/0189646 | A1* | 7/2013 | Hochman | A61C 19/04 |
| | | | | 433/174 |
| 2013/0224683 | A1* | 8/2013 | Zacharia | A61C 1/084 |
| | | | | 433/165 |
| 2015/0056032 | A1* | 2/2015 | Scianamblo | A61B 17/1635 |
| | | | | 408/199 |
| 2015/0202023 | A1* | 7/2015 | Lee | A61C 19/02 |
| | | | | 433/75 |
| 2015/0342709 | A1* | 12/2015 | Huwais | A61C 8/0089 |
| | | | | 433/173 |
| 2017/0245869 | A1* | 8/2017 | Mirochinik | A61B 17/1714 |
| 2018/0168772 | A1* | 6/2018 | Abboud | A61C 8/0089 |
| 2019/0029695 | A1* | 1/2019 | Huwais | A61B 17/1615 |
| 2021/0282904 | A1* | 9/2021 | Chen | A61C 8/0089 |

FOREIGN PATENT DOCUMENTS

| | | | |
|---|---|---|---|
| KR | 20200058706 A | * 5/2020 | |
| WO | WO-2020210442 A1 | * 10/2020 | A61B 17/1615 |

* cited by examiner

142

(a)  (b)

(a)  (b)

2

DRILL FOR DENTAL IMPLANT PROCEDURE

CROSS-REFERENCE TO RELATED APPLICATION

This application claims priority to and the benefit of Korean Patent Application No. 10-2021-0012259, filed in the Korean Intellectual Property Office on Jan. 28, 2021, the entire contents of which are incorporated herein by reference.

BACKGROUND OF THE INVENTION

Field of the Disclosure

The present disclosure relates to a drill for dental implant procedure. More specifically, the present relates to a drill for dental implant procedure capable of minimizing the removal of alveolar bone by rotation in the case of forward rotation about a central axis and easily performing sinus lift without damaging the sinus membrane while compressing the bone density of the alveolar bone by rotation in the case of inverse rotation about the central axis.

Description of the Related Art

Recently, in dentistry, an implant technique for placing artificial teeth is rapidly spreading. However, many of the patients have an oral structure that makes it difficult for implant procedure to be performed, so they suffer from difficulties in implant procedure, and some doctors avoid such patients. In particular, there is a lot of difficulty when it is difficult to place the implant due to the lack of residual bone in the posterior teeth where the maxillary sinus is located. In this case, a method of lifting a sinus membrane to form a space and then transplanting a bone in secured space and placing the implant therein is used, which is divided into two types: a vertical approach and a lateral approach.

First, the vertical approach is a method when a certain amount of residual bone is secured at the implant site (the thickness of the residual bone is more than 4 mm thick), and the vertical approach is a method of tapping a maxilla several times with a tool called an osteotome (chisel and hammer) to make a hole with a diameter of 2 to 3 mm to prevent damage to the sinus membrane, and then inserting a graft bone through the hole little by little. This has the advantage of less swelling in the patient after the procedure because the treatment site is narrow, but since the maxillary sinus lining cannot be seen directly during the procedure, the procedure is checked with X-rays and the operation is carried out very carefully. For this reason, there are problems that the procedure takes a long time and a considerable discomfort to the patient occurs due to the blow in the procedure.

Next, the lateral approach is a method performed when the residual bone at the implant site is very insufficient (the thickness of the residual bone is less than 4 mm thick), and is the method of forming a hole (window) on the side of the sinus to lift the sinus membrane, and then bone graft is performed. This has the advantage that the sinus membrane can be lifted while looking directly at the sinus membrane during the procedure, so that damage to the sinus membrane is less likely, and even if damage occurs, post-treatment is possible, and rapid progress is possible because a desired amount of bone graft material can be quickly inserted at a time. But since the operation itself is difficult and a large valve must be formed, there is a problem that severe edema occurs after the operation, and such a procedure is avoided.

Recently, the sinus lift was performed using an implant drill. Technique using the implant drill may have the advantage that the patient reluctance is low and maxillary perforation is possible quickly and easily, but this could not avoid the phenomenon that the sinus is torn or curled up by a tip of a drill blade because there is no means to block the tip of the drill blade from contacting the sinus membrane at the moment the maxillary perforation is completed by the rotation of the drill blade.

PRIOR ART DOCUMENT

Patent Document

Korean Patent No. 10-1019121

SUMMARY

The present disclosure provides a drill for dental implant procedure capable of minimizing the removal of alveolar bone by rotation in the case of forward rotation about a central axis and easily performing sinus lift without damaging the sinus membrane while compressing the bone density of the alveolar bone by rotation in the case of inverse rotation about the central axis.

The present disclosure provides a drill for dental implant procedure capable of safely performing the implant procedure while giving a user a sense of trust by adjusting a length of the drill inserted into the maxillary sinus according to the state of the alveolar bone by fastening a stopper to a body portion of the drill.

In an aspect, there is provided a drill for dental implant procedure including: a body portion extending in a longitudinal direction and including cylindrical first and second rotating portions rotatable in both directions about a central axis, In this case, the first rotating portion may include a cutting head portion disposed at a front end of the first rotating portion and including a tip surface with round shape; a first spiral groove portion connected to the cutting head portion and including at least one or more grooves along the spiral around the central axis; and a first cutting side surface portion connected to the first spiral groove portion and formed to have a slope inclined upward from the cutting head portion in the shape of a predetermined plate protruding from the central axis.

Furthermore, the second rotating portion formed integrally with the first rotating portion may include a second spiral groove portion connected to the first rotating portion and including at least one or more grooves along the spiral around the central axis; and a second cutting side surface portion connected to the first spiral groove portion and formed to have a slope inclined upward from the first rotating portion in the shape of a predetermined plate protruding from the central axis.

In addition, the first cutting side surface portion may include a first cutting right side surface portion rotating to be twisted so that an inclination sharply changes from the outside toward the central axis in a right direction about the central axis in the case of forward rotation; and a first cutting left side surface portion rotating to be twisted so that an inclination sharply changes sharply from the central axis to the outside in a left direction about the central axis in the case of inverse rotation.

Furthermore, the second cutting side surface portion may include a second cutting right side surface portion rotating to be twisted so that an inclination sharply changes from the outside toward the central axis in the right direction about the central axis in the case of forward rotation; and a second cutting left side surface portion rotating to be twisted so that an inclination sharply changes from the axis to the outside in the left direction about the central axis, In this case, based on the central axis, a length of the second cutting right side surface portion may be formed longer than a length of the second cutting left side surface portion, and the second cutting side surface portion may include a cutting end surface portion formed in a round cross section and connecting the second cutting right side surface portion and the second cutting left side surface portion.

The first cutting side surface portion and the second cutting side surface portion may be rotated in the same direction at the same time in the case of forward rotation and inverse rotation.

The drill for dental implant procedure may further includes a stopper extending in the longitudinal direction corresponding to a shape of the body portion, formed in a cylindrical shape having a predetermined diameter, and screwed to an outer surface of the body portion.

In this case, the first cutting right side surface portion and the first cutting right side surface portion first may be rotating than the first cutting left side surface portion and the second cutting left side surface portion in the case of forward rotation.

The first cutting left side surface portion and the second cutting left side surface portion first may be rotating than the first cutting right side surface portion and the first cutting right side surface portion in the case of inverse rotation.

In this case, the stopper may include a screw coupling groove including a first coupling groove coupled to an upper surface of the body portion and a second coupling groove coupled to a lower surface of the body portion, and an inner diameter of the first coupling groove may be larger than an inner diameter of the second coupling groove.

DESCRIPTION OF EXEMPLARY EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The specification describes in the embodiment for the present invention the term used in which relayed a number that is even endured. In the specification, a plurality type comprises a unit in a single may be phrase will not specially mentioned. Used in specification "(comprises) comprising" and/or "including (comprising)" at least one other handle components other components does not number the presence or addition times. The same drawing code which defines the same element throughout the specification, "and/or" ensures that all components and at least one each of a combination. Although "number 1", "number 2" is used to describe various components or the like, these components are not one number by these terms the concave disclosed. These terms have only one component used to discriminate between other components are disclosed. The, hereinafter referred to as number 1 in technical idea of the present invention components may be as well as in number 2 component are disclosed.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Hereinafter, embodiments disclosed in the present disclosure will be described in detail with reference to the accompanying drawings.

Figure 1:
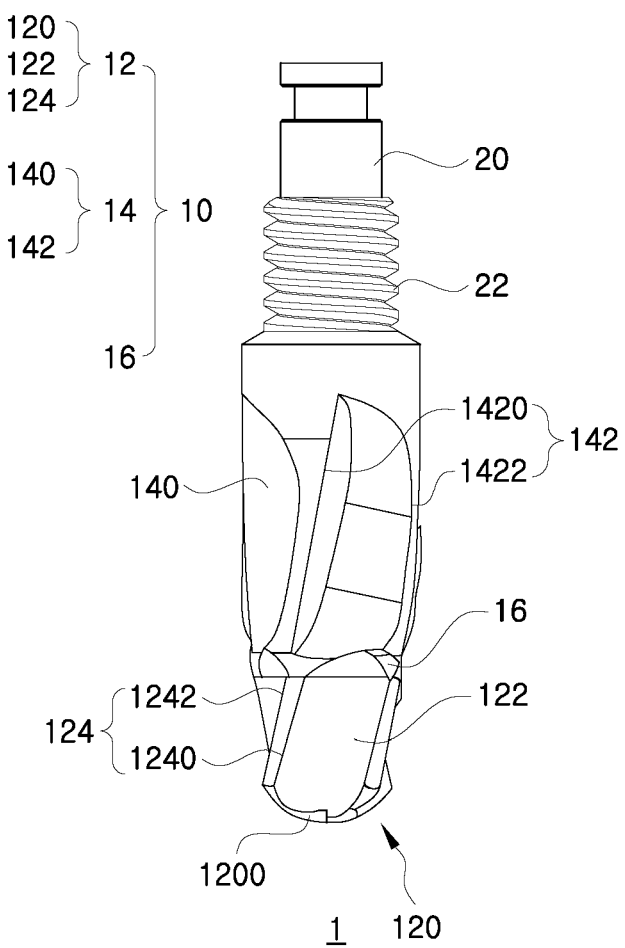
FIG. 1 is a view for explaining a drill for dental implant procedure according to an embodiment of the present disclosure.
Figure 2:
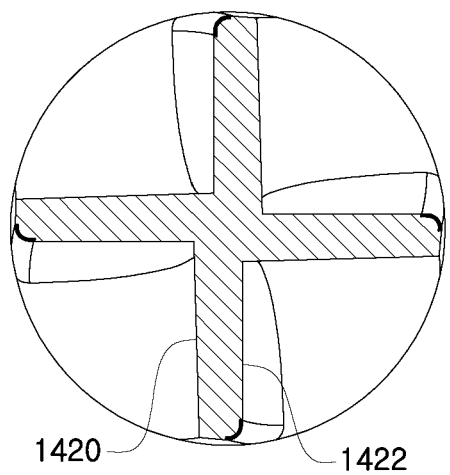
FIG. 2 is a view for explaining a second cutting side surface portion shown in FIG. 1.

FIG. 1 is a view for explaining a drill for dental implant procedure according to an embodiment of the present disclosure, and FIG. 2 is a view for explaining a second cutting side surface portion shown in FIG. 1.

As shown in FIG. 1, a drill for dental implant procedure 1 according to an embodiment of the present disclosure may include a body portion 10 and a connection support portion 20. In this case, the body portion 10 and the connection support portion 20 may be integrally formed, but are not limited thereto.

The body portion 10 may be formed in a cylindrical shape, and may include a first rotation portion 12, a second rotation portion 14, and a connection groove 16 formed between the first rotation portion 12 and the second rotation portion 14. In this case, the first rotation portion 12, the second rotation portion 14, and the connection groove may be integrally formed and rotate in a forward direction (a right side) or an inverse direction (a left side).

In this embodiment, a length of the body portion 10 may be a maximum of 10 mm and a diameter of 3.1 mm to 3.7 mm, but is not limited thereto. For example, when the drill for dental implant procedure 1 is inserted into an implant hole 46, the maximum diameter may be 3.1 mm when it is inserted with a length of 3.1 mm, the maximum diameter may be 3.7 mm when it is inserted with a length of 8 mm, and the maximum diameter may be 3.7 mm when it is inserted with a length of 10 mm. In this case, the length of the body portion 10 may be a length including the connection portion 22.

The first rotating portion 12 is disposed at a front end of the body portion 10, and an alveolar bone 40 may be perforated by rotation.

Specifically, the first rotating portion 12 may include a cutting head portion 120, and a first spiral groove portion 122.

The cutting head portion 120 may be disposed at the front end of the first rotating portion 12 and may include a cutting edge 1200.

In the present embodiment, although the cutting head portion 120 is disclosed to have a round shaped tip surface, the present disclosure is not limited thereto. Here, the "round" shape may be a concept including a shape in which a curved section and a straight section are mixed such as rounded corners or even a semi-ellipse shape.

In this case, an upper surface of the cutting edge 1200 may be formed to be inclined downward toward the central axis. For example, the upper surface of the cutting edge 1200 may have a rounded outer surface shape in which the slope gradually becomes gentle from the outside to the center.

In addition, a side portion of the cutting edge 1200 may be formed to be inclined downward from an upper surface to a lower surface of the cutting edge 1200. For example, the slope of the side portion of the cutting edge 1200 gradually becomes gentle from the top to the bottom, and a diameter of the upper surface may be formed smaller than a diameter of the lower surface.

When the cutting head portion 120 rotates in the forward direction according to the rotation of the body portion 10, the cutting head portion 120 temporarily forms the implant hole 46 until the cutting edge 1200 contacts the surface of the alveolar bone 40 after the cutting edge 1200 touches the surface of the alveolar bone 40 first for perforation of the alveolar bone 40. When the cutting edge 1200 contacts the alveolar bone 40, cutting starts, and the implant hole 46 corresponding to the diameter of the implant may be formed.

In addition, in the upper molar implant procedure, the cutting head portion 120 may perforate an alveolar periosteum 42 of a maxillary sinus 44 so as not to reach the alveolar periosteum 42 in the maxillary sinus 44 by the rotation of the cutting edge 1200 in the case of inverse rotation according to the rotation of the body portion 10.

The first spiral groove portion 122 may be formed as a spiral groove to discharge wastes such as bone fragments, blood, or saliva generated when the alveolar bone 40 is perforated. That is, bone fragments cut by the cutting edge 1200 may not be accumulated on the upper surface of the cutting edge 1200 and may be discharged to the outside through the first spiral groove portion 122.

The first spiral groove portion 122 may be recessed along the spiral around the central axis extending in a longitudinal direction of the body portion 10. In this case, the horizontal cross-section of the first spiral groove portion 122 may have a fan shape, and preferably may have a fan shape having a central angle of 30 degrees to 60 degrees.

In the present embodiment, the first spiral groove portion 122 is disclosed as three, but the present invention is not limited thereto, and three or more may be provided.

For example, when a plurality of the first spiral groove portions 122 are provided, each of the first spiral groove portions 122 may be formed to be spaced apart from each other at equal intervals.

The first cutting side surface portion 124 may be formed to have a slope inclined upward from the cutting head portion 120 to the first cutting side surface portion 124 in the shape of a predetermined plate protruding from the central axis, and may be include the first cutting right side surface portion 1240 and a first cutting left side surface portion 1242. In this case, the first cutting side surface portion 124 may be formed in a rhombic shape, but is not limited thereto.

The first cutting right side surface portion 1240 may remove the alveolar bone 40 by the rotation of the body portion 10, and the first cutting left side surface portion 1242 may not remove the alveolar bone 40. That is, the first cutting right side surface portion 1240 may be formed of a surface capable of cutting, and the first cutting left side surface portion 1242 may be formed of a surface not capable of cutting.

For example, in the case of forward rotation, the first rotating portion 12 may be rotated to be twisted so that an inclination changed sharply from the outside toward the central axis in a right direction about the central axis, so that the first cutting right side surface portion 1240 may remove the alveolar bone 40. In addition, in the case of inverse rotation, the first rotating portion 12 may be rotated to be twisted so that the inclination changes sharply from the central axis toward the outer side in the left direction about the central axis, so that the first cutting left side surface portion 1242 may perforate the alveolar periosteum 42 of the maxillary sinus 44 so as not to the alveolar periosteum 42 in the maxillary sinus 44 without removing the alveolar bone 40.

In the case of forward rotation, when the implant hole 46 formed up to the alveolar bone 40 located under the alveolar periosteum 42 of the maxillary sinus 44 so as not to reach the alveolar periosteum 42 in the maxillary sinus 44 does not match the diameter of the implant, the first rotation portion 12 as described above may be operated to match the diameter of the implant by minimizing the removal of the alveolar bone 40.

In addition, in the case of inverse rotation, in the upper molar implant procedure, the first rotating portion 12 may minimize damage to the alveolar periosteum 42 while facilitating perforation, and the upper end of the alveolar bone 40 may be easily lifted toward the maxillary sinus 44 along with the alveolar periosteum 42.

The second rotating portion 14 may include a second spiral groove portion 140 and a second cutting side surface portion 142.

The second spiral groove portion 140 may be formed as a spiral groove to discharge wastes such as bone fragments, blood, or saliva generated when the alveolar bone 40 is perforated. That is, bone fragments cut by the cutting edge 1200 may not be accumulated on the upper surface of the cutting edge 1200 and may be discharged to the outside through the first spiral groove portion 122 and the second spiral groove portion 140.

The second spiral groove portion 140 may be recessed along the spiral around the central axis extending in a longitudinal direction of the body portion 10. In this case, the horizontal cross-section of the second spiral groove portion 140 may have a fan shape, and preferably may have a fan shape having a central angle of 30 degrees to 60 degrees.

In the present embodiment, the second spiral groove portion 140 is disclosed as three same as the first spiral groove 122, but the present invention is not limited thereto, and three or more may be provided.

For example, when a plurality of the second spiral groove portions 140 are provided, each of the second spiral groove portions 140 may be formed to be spaced apart from each other at equal intervals.

The second cutting side surface portion 142 may be formed to have a slope inclined upward from the first rotation portion 12 to the second cutting side surface portion 142 in the shape of a predetermined plate protruding from the central axis, and may be include the second cutting right side surface portion 1420, and a second cutting left side surface portion 1422. In this case, the second cutting side surface portion 142 may be formed in a rhombic shape, but is not limited thereto. In this case, based on the central axis, a length of the second cutting right side surface portion 1420 may be formed longer than a length of the second cutting left side surface portion 1422.

Referring to FIG. 2, the second cutting right side surface portion 1420 may have a sharp cross section. That is, the second cutting right side surface portion 1420 may be made of a surface capable of cutting, and, in the case of forward rotation, the alveolar bone 40 may be removed. In contrast, in the case of inverse rotation, the second cutting left side surface portion 1422 may push the alveolar bone 40 to expand the alveolar bone 40.

Unlike the cutting right side surface portion 1420, the second left cutting side surface portion 1422 may have a blunt cross section that is not sharp. That is, the second cutting left side surface portion 1422 may be formed as a surface that is not capable of cutting.

Depending on the embodiment, may be include a cutting end surface portion an end surface connecting the second cutting right side surface portion 1420 and the second left cutting side surface portion 1422, and may be formed in a round shape, but is not limited thereto. For example, the cutting end surface portion may be formed to be rounded from the end of the second cutting right side surface portion 1420 toward the second left cutting side surface portion 1422.

In the case of forward rotation, the second rotating portion 14 may be rotated to be twisted so that an inclination changed sharply from the outside toward the central axis in a right direction about the central axis, so that the second cutting right side surface portion 1420 as described above may remove the alveolar bone 40. That is, in the case of forward rotation, the second cutting side surface portion 142 may perform a role of a cortical drill.

In addition, in the case of inverse rotation, the second rotating portion 14 may be rotated to be twisted so that the inclination changes sharply from the central axis toward the outer side in the left direction about the central axis, so that, by pushing the alveolar bone 40 in the rotational direction without removing the alveolar bone 40, the second cutting left side surface portion 1422 may easily and conveniently performs sinus lift without damaging the sinus membrane while increasing the stiffness of the alveolar bone 40 by expanding the alveolar bone 40 and compressing the bone density of the alveolar bone 40.

Therefore, when the alveolar bone 40 is removed to match the diameter of the implant after forming the implant hole 46, the second cutting side surface portion 142 may be performed to match the diameter of the implant by minimizing the removal of the alveolar bone 40 by using the drill for dental implant procedure 1 having a diameter smaller than the initial diameter of the implant hole 46.

For example, if the fixture diameter of the drill for dental implant procedure 1 used when the implant hole 46 was first formed is 4.5, when the alveolar bone 40 is removed to match the diameter of the implant, the removal of the alveolar bone 40 may be minimized by using the drill for dental implant procedure 1 with a 4.0 fixture diameter.

In the case of forward rotation, when the implant hole 46 formed up to the alveolar bone 40 located under the alveolar periosteum 42 of the maxillary sinus 44 so as not to reach the alveolar periosteum 42 in the maxillary sinus 44 does not match the diameter of the implant, the second rotation portion 14 as described above may be operated to match the diameter of the implant by minimizing the removal of the alveolar bone 40.

In addition, in the case of inverse rotation, the second rotating portion 14 may compress the bone density of the alveolar bone 40 and reinforces the rigidity of the alveolar bone 40 by pushing the alveolar bone 40 in both directions, and may facilitate perforation and minimize damage to the alveolar periosteum 42 by preventing damage to the alveolar bone 40 due to vibration, and may easily lift the upper end of the alveolar bone 40 together with the alveolar periosteum 42 toward the maxillary sinus 44.

The connection groove 16 may be a groove that has a predetermined width on the outer circumferential surface of the body portion 10 and is recessed along a circumference formed with a central axis as a rotation center.

Specifically, the connection groove 16 may be formed to have a predetermined width between the first rotation portion 12 and the second rotation portion 14. That is, the horizontal cross-section of the connection groove 16 may be formed in a circular shape having a predetermined diameter corresponding to the circular shape of the body portion 10, but is not limited thereto.

In the present embodiment, although the connection groove 16 is disclosed as one, the present disclosure is not limited thereto, and one or more may be provided.

For example, when a plurality of connection grooves 16 are provided, a diameter of the connection groove 16 formed on the side of the first rotation portion 12 and the connection groove 16 formed on the side of the second rotation portion 12 may be different from a diameter of the first rotation portion 12 and a diameter of the second rotation portion 14.

In this case, each of the connection grooves 15 may be formed to be spaced apart from each other at the same interval, but the present disclosure is not limited thereto.

Depending on the embodiment, the connection groove 16 may be omitted.

One side of the connection support portion 20 may extend in the longitudinal direction and be connected to a lower portion of the body portion 10 by extending in the longitudinal direction, and the other side may be connected to an electric motor (not shown).

In addition, the connection support portion 20 may be formed under the body portion 10 by a connection portion 22 having screw threads on the outer circumferential surface of the part connected to the second rotation portion 14 of the body portion 10. The connection portion 22 may include a plurality of spiral grooves recessed along the spiral.

In this case, the connection support portion 20 may be made of the same material as the body portion 10, but is not limited thereto.

The connection support portion 20 may transmit the rotational power generated from the electric mechanism to the body portion 10, and make the body portion 10 rotate in the forward direction or inverse direction.

Figure 3:
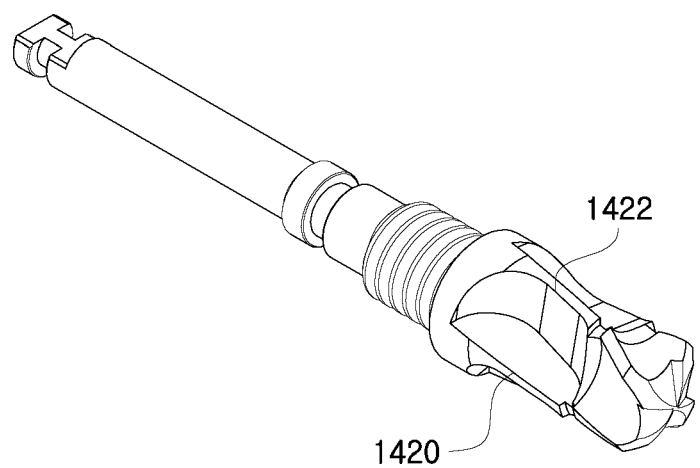
FIG. 3 is a view for explaining a state of use of a drill for dental implant procedure according to an embodiment of the present disclosure.
Figure 4:
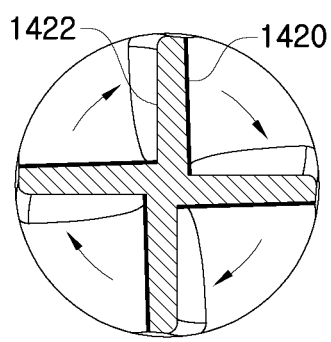
FIG. 4 is a view for explaining a state of use of a drill for dental implant procedure in the case of forward rotation.
Figure 4:
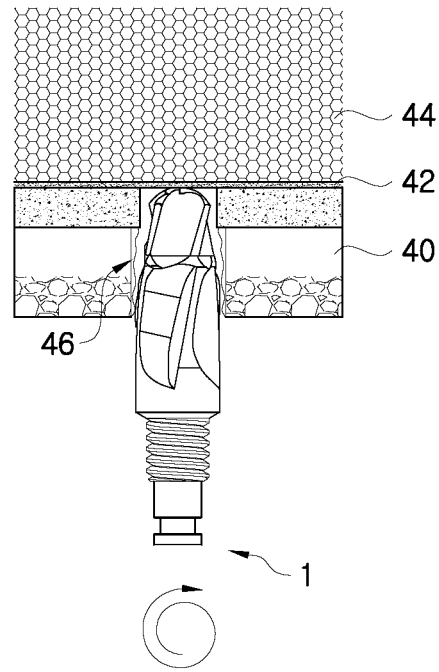
Figure 5:
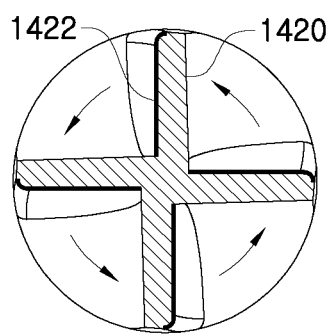
FIG. 5 is a view for explaining a state of use of a drill for dental implant procedure in the case of inverse rotation.
Figure 5:
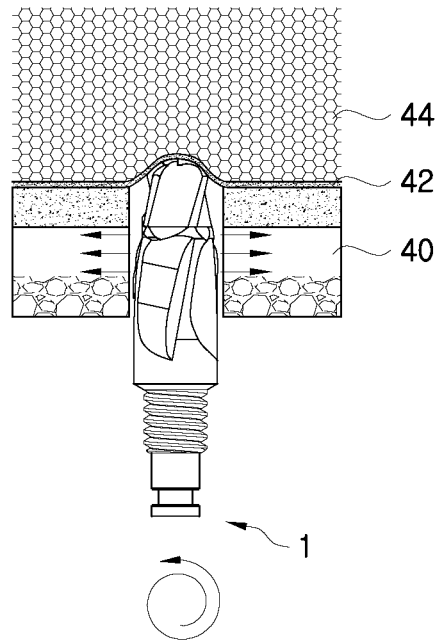

FIG. 3 is a view for explaining a state of use of a drill for dental implant procedure according to an embodiment of the present disclosure. FIG. 4 is a view for explaining a state of use of a drill for dental implant procedure in the case of forward rotation, FIG. 4(a) is a view for explaining a forward rotation state, and FIG. 4(b) is a view for explaining a forward rotation method. FIG. 5 is a view for explaining a state of use of a drill for dental implant procedure in the case of inverse rotation, FIG. 5(a) is a view for explaining an inverse rotation state, FIG. 5(b) is a view for explaining an inverse rotation method.

First, referring to FIG. 3, when the body portion 10 is rotated by the rotational power transmitted from the connection support portion 20, the first cutting right side surface portion 1240 of the first cutting side surface portion 124 of the first rotation portion 12 and the second cutting right side surface portion 1420 of the second cutting side surface portion 142 of the second rotation portion 14 may be removed, the first cutting left side surface portion 1242 of the first cutting side surface portion 124 of the first rotation portion 12 and the second cutting left side surface portion 1422 of the second cutting side surface portion 142 of the second rotation portion 14 may not be removed.

For example, in the case of forward rotation, the first rotating portion 12 may be rotated to be twisted so that an inclination changed sharply from the outside toward the central axis in a right direction about the central axis as shown in FIG. 4(a), and the second rotating portion 14 may be rotated to be twisted so that an inclination changed sharply from the outside toward the central axis in a right direction about the central axis as shown in FIG. 4(b), so that the second cutting right side surface portion 1420 may remove the alveolar bone 40. That is, in the case of forward rotation, the first cutting right side surface portion 1240 of the first cutting side surface portion 124 of the first rotation portion 12 and the second cutting right side surface portion 1420 of the second cutting side surface portion 142 of the second rotation portion 14 first rotating than the first cutting left side surface portion 1242 of the first cutting side surface portion 124 of the first rotation portion 12 and the second cutting left side surface portion 1422 of the second cutting side surface portion 142 of the second rotation portion 14 may remove the alveolar bone 40.

And, in the case of inverse rotation, the second rotating portion 14 may be rotated to be twisted so that the inclination changes sharply from the central axis toward the outer side in the left direction about the central axis as shown in FIG. 5(a), so that the first cutting left side surface portion 1242 may perforate the alveolar periosteum 42 of the maxillary sinus 44 so as not to the alveolar periosteum 42 in the maxillary sinus 44 without removing the alveolar bone 40 as shown in FIG. 5(b). Furthermore, the second rotating portion 14 may be rotated to be twisted so that the inclination changes sharply from the central axis toward the outer side in the left direction about the central axis, so that, by pushing the alveolar bone 40 in the rotational direction without removing the alveolar bone 40, the second cutting left side surface portion 1422 may easily and conveniently performs sinus lift without damaging the sinus membrane while increasing the stiffness of the alveolar bone 40 by expanding the alveolar bone 40 and compressing the bone density of the alveolar bone 40. That is, in the case of inverse rotation, the first cutting left side surface portion 1242 of the first cutting side surface portion 124 of the first rotation portion 12 and the second cutting left side surface portion 1422 of the second cutting side surface portion 142 of the second rotation portion 14 first rotating than the first cutting right side surface portion 1240 of the first cutting side surface portion 124 of the first rotation portion 12 and the second cutting right side surface portion 1420 of the second cutting side surface portion 142 of the second rotation portion 14 may by pushing the alveolar bone 40.

Figure 6:
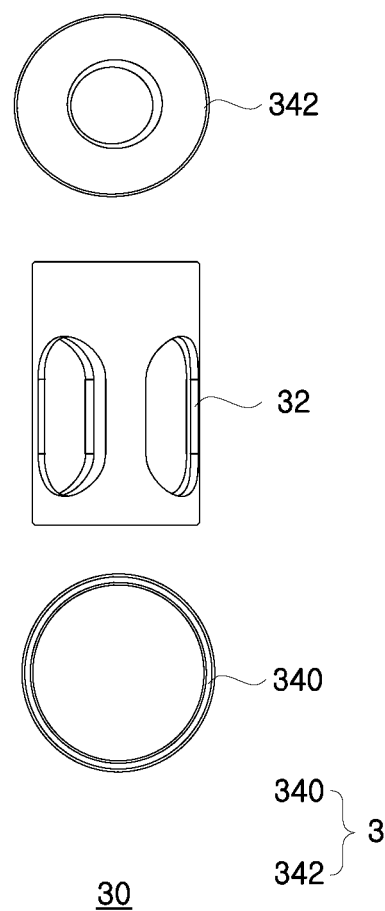
FIG. 6 is a detailed view for explaining a drill for dental implant procedure according to another embodiment of the present invention.
Figure 7:
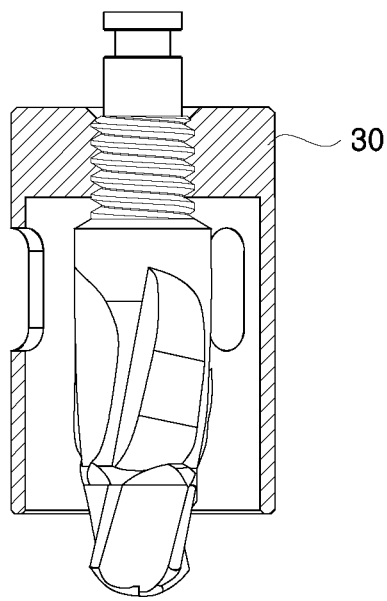
FIG. 7 is a view for explaining coupling state of a stopper shown in FIG. 5 and the drill for dental implant procedure.
Figure 8:
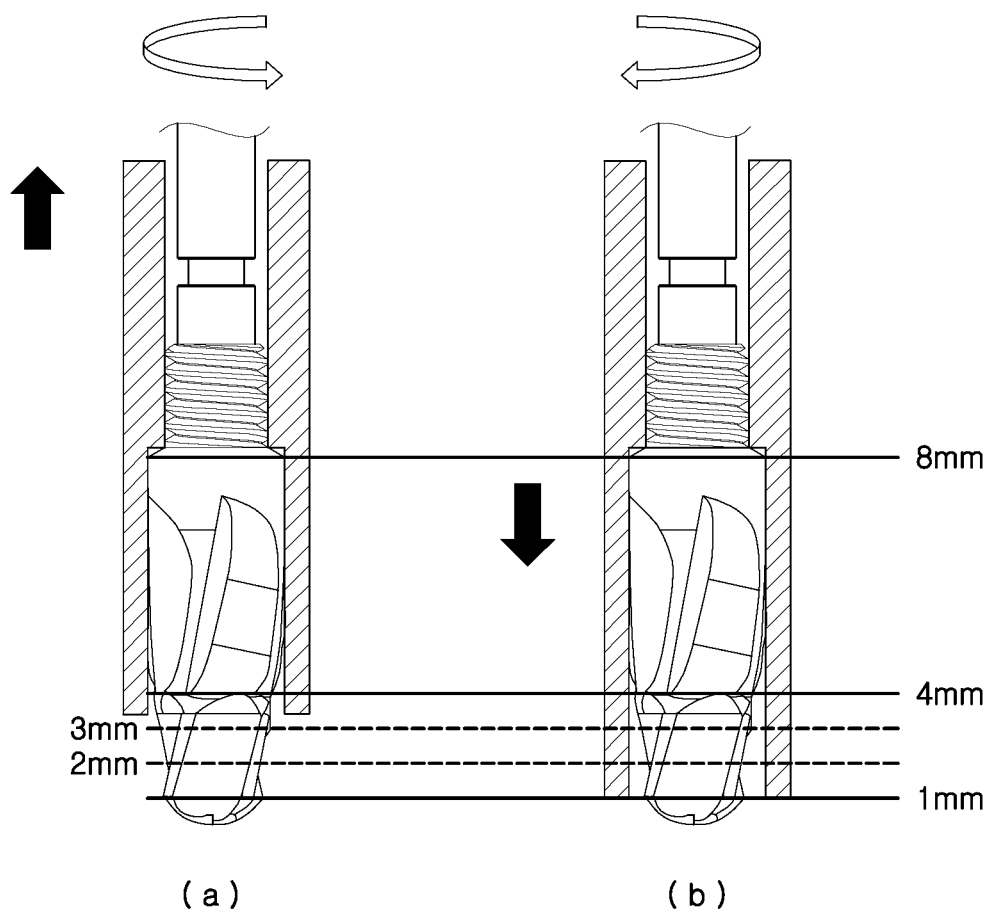
FIG. 8 is a view for explaining a method of adjusting a length of a drill for dental implant procedure inserted into an implant hole using the stopper.

FIG. 6 is a detailed view for explaining a drill for dental implant procedure according to another embodiment of the present invention, FIG. 7 is a view for explaining coupling state of a stopper shown in FIG. 5 and the drill for dental implant procedure, FIG. 8 is a view for explaining a method of adjusting a length of a drill for dental implant procedure inserted into an implant hole using the stopper, FIG. 8(a) is a view for explaining a method of lengthening the length of the drill for dental implant procedure, and FIG. 8(b) is a view for explaining a method of shortening the length of the drill for dental implant procedure.

As shown in FIG. 6 and FIG. 7, the drill for dental implant procedure 2 may include a stopper 30 screwed to the outer surface.

Except for the stopper 30 shown in FIG. 6 and FIG. 7, it may have the same features as the drill for dental implant procedure 1.

In FIG. 6 and FIG. 7 below, detailed descriptions of content overlapping with those described in FIG. 1 may be omitted, and different points may be mainly described. Accordingly, components that perform the same functions as those of the dental implant procedure drill shown in FIG. 6 and FIG. 7 are denoted by the same reference numerals as in FIG. 1 and detailed descriptions thereof will be omitted.

The stopper 30 may be coupled to the outer surface of the drill for dental implant procedure 1 by a screw adjustment method.

A cylindrical body portion 32 may extend in the longitudinal direction corresponding to the shape of the body portion 10 and may be formed in a cylindrical shape having a predetermined diameter.

Specifically, the cylindrical body portion 32 may have a screw coupling groove 34 therein so that it can be screwed in correspondence with the screw groove of the connection portion 22.

An inner diameter of the screw coupling groove 34 may be the same as or larger than the maximum diameter of the body portion 10, but is not limited thereto.

For example, a diameter of the first coupling groove 340 coupled to the upper surface of the body portion 10 may be larger than a diameter of the second coupling groove 342 coupled to the lower surface of the body portion 10.

In other words, by adjusting the positions of the first coupling groove 340 and the second coupling groove 342 having different diameters corresponding to the outer surface of the body portion 10, it is possible to lengthen the length of the drill for dental implant procedure 2.

For example, when it is necessary to lengthen the length of the drill for dental implant procedure 2 according to the depth of the alveolar bone 40 as shown in FIG. 8(a), the second coupling groove 342 of the cylindrical body portion 32 may be disposed on the outer surface of the connection support portion 20 by screwing the cylindrical body portion 32 toward the connection support portion 20, that is, inverse rotation.

Unlike this, when it is necessary to shorten the length of the drill for dental implant procedure 2 according to the depth of the alveolar bone 40 as shown in FIG. 8(b), the first coupling groove 340 of the cylindrical body portion 32 may be disposed on the outer surface of the first rotating portion 12 by screwing the cylindrical body portion 32 toward the body portion 10, that is, forward rotation.

The steps of a method or algorithm described in connection with the embodiments of the present disclosure may be implemented directly in hardware, implemented as a software module executed by hardware, or a combination thereof. Software may also reside on random access memory (RAM), read only memory (ROM), erasable programmable ROM (EPROM), electrically erasable programmable ROM (EEPROM), flash memory, hard disk, removable disk, CD- ROM, or any type of computer-readable recording medium well known in the art to which the present disclosure pertains.

In the above, embodiments of the present disclosure have been described with reference to the accompanying drawings, but those of ordinary skill in the art to which the present invention pertains will be able to understand that the present invention can be implemented in other specific forms without changing the technical spirit or essential features thereof. Therefore, the embodiments described above are illustrative in all respects and should be understood as non-limiting.

What is claimed is:

1. A drill for dental implant procedure comprising:
    a body portion extending in a longitudinal direction and including a first cylindrical rotating portion and a second rotating portion rotatable in both directions about a central axis,
    wherein the first rotating portion comprising:
    a cutting head portion disposed at a front end of the first rotating portion and including a tip surface with round shape;
    a first spiral groove portion connected to the cutting head portion and including at least one or more grooves along the spiral around the central axis; and
    a first cutting side surface portion connected to the first spiral groove portion and formed to have a slope inclined upward from the cutting head portion in the shape of a predetermined plate protruding from the central axis,
    wherein the second rotating portion formed integrally with the first rotating portion comprising:
    a second spiral groove portion connected to the first rotating portion and including at least one or more grooves along the spiral around the central axis; and
    a second cutting side surface portion connected to the second spiral groove portion and formed to have a slope inclined upward from the first rotating portion in the shape of a predetermined plate protruding from the central axis,
    wherein the cutting head portion is configured to remove only the alveolar bone laterally to form the implant hole and does not perforate an alveolar periosteum in the case of forward rotation, and the cutting head portion perforates the alveolar periosteum in the case of inverse rotation,
    wherein the first cutting side surface portion expands the implant hole by cutting the alveolar bone simultaneously along with the cutting head portion in the case of forward rotation, and the first cutting side surface portion perforates the alveolar periosteum simultaneously along with the cutting head portion in the case of inverse rotation, and
    wherein the second cutting side surface portion expands the implant hole by cutting the alveolar bone simultaneously along with the first cutting side surface portion in the case of forward rotation, and the second cutting side surface portion does not cut the alveolar bone but pushes bone particles to expand and condense the implant hole.

2. The drill for dental implant procedure of claim 1, the first cutting side surface portion comprising: a first cutting right side surface portion twisted about the central axis so that an inclination sharply changes from the outside toward the central axis in a right direction about the central axis in the case of forward rotation; and a first cutting left side surface portion twisted about the central axis so that an inclination sharply changes sharply from the central axis to the outside in a left direction about the central axis in the case of inverse rotation.

3. The drill for dental implant procedure of claim 2, the second cutting side surface portion comprising: a second cutting right side surface portion twisted about the central axis so that an inclination sharply changes from the outside toward the central axis in the right direction about the central axis in the case of forward rotation; and a second cutting left side surface portion twisted about the central axis so that an inclination sharply changes from the axis to the outside in the left direction about the central axis, wherein based on the central axis, a length of the second cutting right side surface portion is formed longer than a length of the second cutting left side surface portion, and wherein a cutting end surface portion of the second cutting right side surface portion is formed as a vertical section for removing the alveolar bone in the case of forward rotation, and a cutting end surface portion of the second cutting left side surface portion is formed as a round section for not removing the alveolar bone in the case of inverse rotation.

4. The drill for dental implant procedure of claim 1, comprising:
    a stopper extending in the longitudinal direction corresponding to a shape of the body portion, formed in a cylindrical shape having a predetermined diameter, and screwed to an outer surface of the body portion.

* * * * *